US009008646B2

(12) United States Patent
Opaluch

(10) Patent No.: US 9,008,646 B2
(45) Date of Patent: Apr. 14, 2015

(54) INBOUND PHONE CONTROL

(75) Inventor: Robert E. Opaluch, East Providence, RI (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/402,374

(22) Filed: Feb. 22, 2012

(65) Prior Publication Data

US 2012/0155619 A1    Jun. 21, 2012

Related U.S. Application Data

(63) Continuation of application No. 11/745,553, filed on May 8, 2007, now Pat. No. 8,160,567.

(51) Int. Cl.
*H04M 3/00* (2006.01)
*H04M 1/66* (2006.01)
*H04M 1/68* (2006.01)
*H04M 3/16* (2006.01)
*H04M 11/04* (2006.01)

(52) U.S. Cl.
CPC ..................... *H04M 11/04* (2013.01)

(58) Field of Classification Search
CPC ....................................................... H04M 11/04
USPC .............. 455/419, 418, 466, 420, 411, 556.1; 709/206; 340/5.74, 4.3, 3.1
See application file for complete search history.

(56) References Cited

U.S. PATENT DOCUMENTS

| 6,640,241 | B1 | 10/2003 | Ozzie et al. | |
|---|---|---|---|---|
| 6,928,464 | B2 | 8/2005 | Appiah et al. | |
| 2002/0078161 | A1 | 6/2002 | Cheng | |
| 2003/0078032 | A1* | 4/2003 | Pei et al. | 455/411 |
| 2003/0088633 | A1* | 5/2003 | Chiu et al. | 709/206 |
| 2003/0139175 | A1* | 7/2003 | Kim | 455/419 |
| 2003/0163826 | A1 | 8/2003 | Weinstein | |
| 2005/0104717 | A1* | 5/2005 | Kaplan | 340/5.74 |
| 2005/0259618 | A1* | 11/2005 | Ahya et al. | 370/331 |
| 2006/0041916 | A1 | 2/2006 | McQuaide, Jr. | |
| 2008/0126517 | A1 | 5/2008 | Nakatsuka et al. | |

FOREIGN PATENT DOCUMENTS

| KR | 10-2001-0100165 | 11/2001 |
|---|---|---|
| WO | 2006/046445 | 5/2006 |

* cited by examiner

*Primary Examiner* — Opiribo Georgewill

(57) ABSTRACT

A method, including receiving at a network element, from a first telecommunications enabled device, a control connection request directed to a second telecommunications enabled device, connecting a control connection to the second telecommunications enabled device wherein the control connection is connected without requiring user input at the second telecommunications enabled device to answer the control connection request, and providing access to one or more functionalities of the second telecommunications enabled device to the first telecommunications enabled device through the control connection.

20 Claims, 4 Drawing Sheets

INBOUND PHONE CONTROL

CROSS REFERENCE TO RELATED APPLICATIONS

This application is a continuation of U.S. patent application Ser. No. 11/745,553, filed on May 8, 2007, by Rober E. Opaluch, entitled INBOUND PHONE CONTROL, the contents of which is hereby incorporated by reference in its entirety.

BACKGROUND INFORMATION

People have become increasingly more mobile. Monitoring individuals who are minors, have age related infirmities or other health issues has become increasing more challenging. Similarly, monitoring individuals who are security concerns has also become more challenging. Communication technology has improved, offering many different options. However, many of these options require a monitored individual to respond to a communication request, such as a call. These options assume that an individual is willing or able to respond to the communication request. Other options require expensive specialized equipment, equipment that is not mobile or equipment that may be not practical for everyday use.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

An exemplary embodiment of the present invention provides caller access to one or more functionalities of a telecommunication device using inbound calling control of the telecommunications device. The caller access may provide one or more remote monitoring or security capabilities utilizing a telecommunications device. The remote monitoring may enable a user or system to monitor a minor, an individual with health concerns or a security threat. An exemplary embodiment of the disclosure may further adapt the telecommunications device to provide further monitoring capability or to address security concerns.

Figure 1:
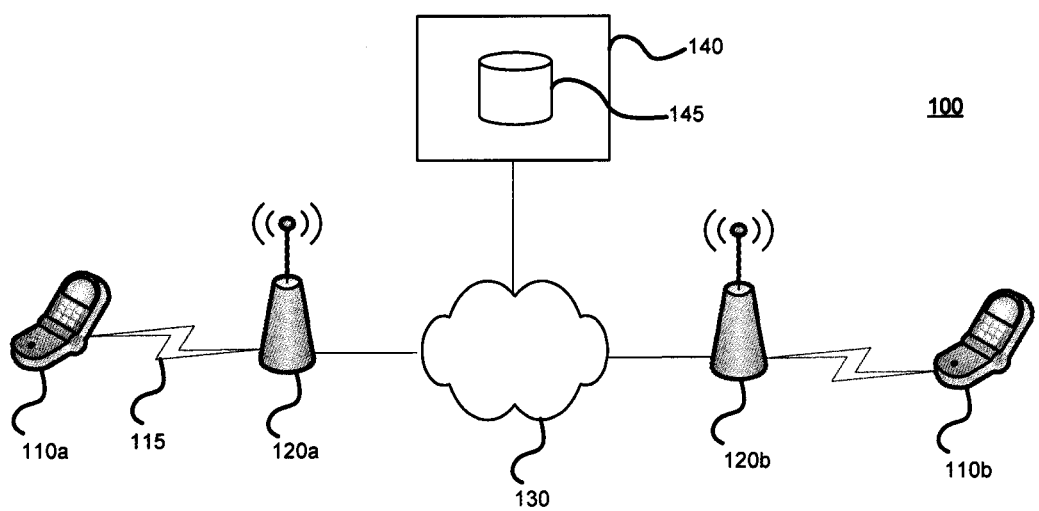
FIG. 1 is an inbound phone control system, in accordance with an exemplary embodiment of the disclosure.

Referring to FIG. 1, an inbound phone control system in accordance with an exemplary embodiment of the disclosure, is illustrated. System 100 illustrates an exemplary system for supporting inbound phone control. As illustrated, Telecommunication Device 110a and 110b may be wireline phones, cellular phones, mobile phones or satellite phones, Personal Digital Assistants (PDA), computers, pagers, video conferencing stations or other telephony enabled devices capable of sending and/or receiving a control connection request to or from a second telecommunications enabled device. For example, Telecommunication Device 110a may connect to a network, e.g., cellular or mobile, to send a Control Connection Request 115 via Network Access Device 120a. Network Access Device 120a may be a wireless access point (WAP) or other network connectivity devices. Network Access Device 120a may permit Telecommunication Device 110a access to Network 130. Network 130 may route Control Connection Request 115 via Network Access Device 120b to Telecommunication Device 110b.

Control Connection Requests 115 on Network 130 may be received by Network Element 140. Network Element 140 may contain Control Connection Request Database 145. Network Element 140 may utilize Control Connection Request Database 145 to verify, provide routing information or authorize Control Connection Requests 115. Network Element 140 may route Control Connection Requests 115 to Telecommunications Device 110b to which a control connection is requested. In one or more embodiments, Control Connection Requests 115 may be routed to a requested device via a second network element such as Network Access Device 120b. Telecommunication Device 110b may be a second telephony enabled device to which a control connection is requested. In one or more embodiments, the device to which a control connection is requested may be a mobile phone. In other embodiments, a control connection request may be directed to an analog phone, a computer or another telephony enabled device. It is noted that System 100 is a simplified view of a network and may include additional elements that are not depicted.

In some embodiments, a user of Telecommunication Device 110a may be a person desiring to connect to Telecommunication Device 110b to remotely monitor an individual who is a minor, an individual with health issues, an individual who is a security threat, the surrounding environment of the device or for other uses. In other embodiments, a user of Telecommunication Device 110a may be a computer system, which may be programmed to request Control Connection Request 115 to obtain data from or to transmit data to Telecommunication Device 110b without requiring a user of Telecommunication Device 110b to respond. Additionally, Telecommunication Device 110a may be a computer system, which may be programmed to request Control Connection Request 115 to obtain data from or to transmit data to Telecommunication Device 110b without requiring Telecommunications Device 110b to be programmed to answer a call. Telecommunication Device 110a, once connected to Telecommunication Device 110b, may control one or more functionalities of Telecommunication Device 110b as described in greater detail in reference to FIG. 2 below.

In one or more embodiments, Telecommunication Device 110a may be a system programmed to automatically connect to Telecommunication Device 110b for monitoring purposes. Telecommunication Device 110a may do so in response to an event such as, a user request, a lack of data received from Telecommunication Device 110b, Global Positioning System (GPS) data received by Telecommunications Device 110a or in response to other criteria. Telecommunication Device 110a may also request a control connection on a scheduled basis or on a periodic basis.

Control Connection Request 115, a control connection request from Telecommunication Device 110a, may be a request for access to one or more functionalities of a telecommunication enabled device. Control Connection Request 115 may be from a user of Telecommunication Device 110a. Control Connection Request 115 may also be requested by a system which may be programmed for monitoring remote telecommunication devices by utilizing control connection requests. Control Connection Request 115 may be a request transmitted utilizing a standard telecommunications protocol or a standard networking protocol. For example, one embodiment may utilize Session Initiation Protocol (SIP). Control Connection Request 115 may represent a SIP INVITE request. In other embodiments, Control Connection Request 115 may be transmitted utilizing other Voice Over IP (VOIP) protocols or other protocols. For example, Control Connection Request 115 may also be transmitted using Wireless Access Protocol (WAP), Multimedia Messaging Service (MMS), Enhanced Messaging Service (EMS), Short Message Service (SMS), Global System for Mobile Communications (GSM), other Transmission Control Protocol/Internet (TCP/IP) Protocols or other protocols suitable for accessing the functionality of Telecommunication Device 110b. Control Connection Request 115 may be transmitted wirelessly or may utilize cabled network or telecom connections such as an Ethernet RJ45/Category 5 Ethernet connection, a fiber connection, a traditional phone wireline connection, a cable connection or other wired network connection. Control Connection Request 115 may use standard wireless protocols including IEEE 802.11a, 802.11b and 802.11g. Control Connection Request 115 may also connect to Network 130 via protocols for a wired connection, such as an IEEE Ethernet 802.3.

Control Connection Request 115 may utilize one or more control channels of a cellular network. For example, Control Connection Request 115 may be forwarded to a Mobile Telephone Switching Office (MTSO) which may then utilize one or more control channels to establish a control connection to the requested device. The control connection may utilize the one or more control channels to access a responder module of the requested device which may provide access to one or more functionalities of the requested device.

Connection Request 115 may require authorization which may be enabled or disabled. In some embodiments, control connection requests may be enabled or disabled at a Telecommunication Device 110b by function of a user interface of that device. In other embodiments, control connection requests may be enabled or disabled at Network Element 140 of a network providing service for that device. Telecommunication Device 110b may have a fixed setting for control connection requests indicating that such requests are either enabled or disabled and this setting may not be changed.

Network Access Device 120a and Network Access Device 120b may be wireless access points (WAP) permitting a mobile phone to transmit Control Connection Request 115 to and/or from Network 130. Network Access Devices 120a and 120b may also be Session Initiation Protocol Devices, modems, routers, switches or other network access devices. Depending on the embodiment of Telecommunication Devices 110a and 110b certain embodiments of Network Access Devices 120a and 120b may be more appropriate than others. In some embodiments, Network Access Devices 120a and 120b may contain Control Connection Request Database 145 and may perform the corresponding verification and/or authorization functionality of Control Connection Request Database 145 described below.

Network 130 may be a local area network (LAN), a wide area network (WAN), the Internet, cellular networks, satellite networks or other networks. Network 130 may utilize one or more protocols of Telecommunication Device 110a or Telecommunication Device 110b. Network 130 may translate to or from other protocols to one or more protocols of Telecommunication Device 110a or Telecommunication Device 110b. Control connection requests transmitted through Network 130 may be received by Network Element 140.

Network Element 140 may be one or more servers, such as a Session Initiation Protocol (SIP) server. Network Element 140 may verify that control connection requests are enabled for Telecommunication Device 110b. Network Element 140 may verify that control connection requests are enabled by querying Telecommunication Device 110b. In other embodiments, Network Element 140 may query Control Connection Request Database 145 to verify that control connection requests are enabled. Control Connection Request Database 145 may be a component of Network Element 140 or Control Connection Request Database 145 may be operatively connected to Network Element 140. If Network Element 140 receives a query response indicating that control connection requests are not enabled for Telecommunication Device 110b, Network Element 140 may send a signal to Telecommunication Device 110a indicating that Control Connection Request 115 is denied. If Network Element 140 receives a query response indicating that Control Connection Requests 115 are enabled Network Element 140 may route Control Connection Request 115 to Telecommunication Device 110b.

In one or more embodiments, Network Element 140 may perform a second verification to check if Control Connection Request 115 may be authorized. Network Element 140 may query Control Connection Request Database 145 to confirm if Control Connection Request 115 is authorized. Authorization may depend on one or more attributes of a requesting device such as the user associated with a requesting device, the network address of a requesting device, the geographical location associated with a requesting device, a phone number associated with a requesting device, the type of requesting device (i.e., PDA, cell phone, computer, etc), or other factors. Control Connection Request Database 145 may contain a list of one or more authorized users, a list of one or more blocked users, or both. The lists may identify users by one or more attributes, such as phone number, network address, name, login name, or other identifying attribute.

Additionally, Control Connection Request Database 145 may contain data and programmed routines to authorize control connection requests originating from preprogrammed telecommunications devices. Control Connection Request Database 145 may contain identifying system attributes such as machine name, Media Access Control (MAC) address, network address or other identifying attributes. Control Connection Request Database 145 may authorize control connection requests by verification of a password, an encrypted key, a code or other validation indicator.

Furthermore, Control Connection Request Database 145 may authorize or deny Control Connection Request 115 based on the nature of the control connection request. Control Connection Request Database 145 may identify a telecommunications device using a registered Mobile Identification Number (MIN) affiliated with the device. Control Connection Request Database 145 may authorize or deny Control Connection Request 115 based on which functionality of Telecommunication Device 110b access is requested to, the time of control connection request, the location of Telecommunication Device 110b, or other pre-specified limiting factors. For example, Telecommunication Device 110b may be configured to permit the capture and live transmission of audio when the device is at a pre-defined geographical location such as while a minor is at school. However, requests for access to capture and send video may be denied. Similarly, requests to capture and send photos from Telecommunication Device 110b or requests to send audio to a speakerphone of Telecommunication Device 110b may be denied.

In another example, Control Connection Requests 115 seeking to power on Telecommunication Device 110b or to access functionality of Telecommunication Device 110b may be denied if Telecommunication Device 110b is currently located at a hospital, at a military installation or other areas where such telecommunications transmissions may be illegal or undesired. The pre-defined geographical location may be verified using Global Positioning System (GPS) capabilities of the Telecommunication Device 110b. The geographical location may also be verified using global system for mobile communications (GSM) localization techniques. Location may also be assumed based on a known schedule of a user of Telecommunication Device 110b.

Different levels of authorization may be provided which may allow access to different types of functionality of a telecommunication device. For example, an emergency medical responder may be granted authorization which permits access to more functionality than the authorization provided to a neighbor of an infirm or elderly telecommunication device user. In other embodiments, a Control Connection Request 115, once it is connected, may permit access to all functionality of Telecommunication Device 110b.

Administration of Control Connection Request Database 145 may be performed by one or more entities. Lists, passwords, keys or other validation and authorization criteria which may permit or deny access may be maintained by a user, a network service provider, a communications carrier, a government entity, a military entity or other entity. Access to lists, passwords, keys and other validation and authorization criteria may be provided by Telecommunication Device 110b, Network Element 140 or by other network accessible devices.

Control Connection Request Database 145 may contain additional data stores. For example, Control Connection Request Database 145 may record transmitted data and/or transaction history of control connection requests and related data. Such data may be used for emergency responders, military applications or other purposes.

Once a control connection request is authorized it may be routed by Network Element 140 through Network 130 to Telecommunication Device 110b via Network Access Device 120b. In some embodiments, Telecommunication Device 110b may include a camera. Control Connection Request 115 may enable a requestor to control the functionality of a camera or other device of Telecommunication Device 110b. Telecommunications Device 110b may include a Multimedia Messaging Service compliant software enabling the transmission of images or video in response to a command from Control Connection Request 115. Telecommunication Device 110b may transmit real time video and/or images as well as stored video and/or images. The control connection requestor may use all the capabilities of Telecommunications Device 110b, such as, but not limited to, zooming the camera, adjusting the camera focus, adjusting the camera contrast controls, adjusting the camera brightness controls and adjusting other controls. Control Connection Request 115 may enable a requestor to transmit or receive audio to or from Telecommunications Device 110b. For example, a guardian of a child may transmit an audio message over a speakerphone of Telecommunications Device 110b to the child without requiring the child to power the device on or respond to the device. In one or more embodiments, security personnel may establish a control connection to a Telecommunication Device 110b in an area they wish to monitor. Telecommunications Device 110b may enable security personnel to receive real time or stored video, pictures, and audio. Telecommunications Device 110b may allow the transmission of other data to a control connection requestor whether obtained in real time or stored on the phone. Data may include, but is not limited to, stored call information, call history, email information, text message information, contact lists, memos, Global Positioning Information and other data.

Telecommunications Device 110b may be locked, disabled or have the battery drained in response to a command transmitted by Control Connection Request 115. For example, an owner of Telecommunications Device 110b may wish to remotely lock or disable Telecommunications Device 110b if it has been stolen.

In some embodiments, Telecommunication Device 110b may contain Control Connection Request Database 145 and may perform the corresponding verification and/or authorization functionality of Control Connection Request Database 145 described above.

The various components of system 100 as shown in FIG. 1 may be further duplicated, combined and/or integrated to support various applications and platforms. Additional elements may also be implemented in the systems described above to support various applications.

Figure 2:
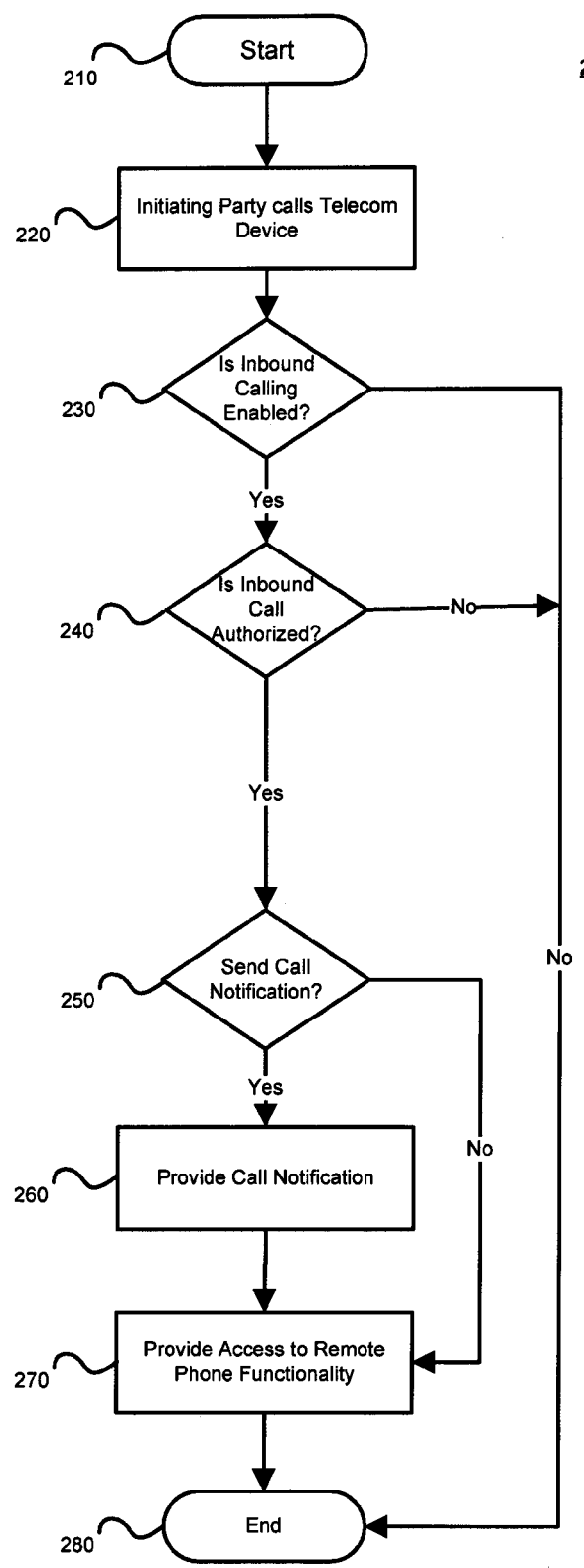
FIG. 2 is a flowchart depicting a method for implementing an inbound phone control system, in accordance with an exemplary embodiment of the disclosure.

Referring to FIG. 2, a flowchart depicting a method for implementing an inbound phone control system is illustrated, in accordance with an exemplary embodiment of the disclosure. According to one or more embodiments, flow chart 200 may begin at block 210.

At block 220, an initiating party may call a telecommunications device. For example, Telecommunication Device 110a may initiate a control connection to Telecommunication Device 110b, which may be transmitted as a call. The initiating party may be a system programmed to call a telecommunications device in response to an event, a schedule or on a periodic basis.

An initiating party, may initiate one or more control connections to one or more telecommunications devices. In one or more embodiments, multiple control connections may be desired by an initiating party in order to widely distribute information or to receive information from a wide range of devices. For example, a government agency may wish to transmit a warning, such as broadcasting information about a tornado, flood, a warning about a fugitive or another warning to a specific region. This may be determined by an area code affiliated with a device, a network address affiliated with a device, Global Positioning System (GPS) coordinates received from a device or other identifying information. In another example, an initiating party may wish to transmit an amber alert using multiple control connections to alert one or more of the devices in a specified region that a child has been kidnapped. Broadcast information may be audio messages, text messages, emails, graphics or other alerting information.

An initiating party may wish to receive information from one or more devices in a region where there is a crisis, a disaster, or a fugitive. For example, an initiating party may desire to establish control connections to multiple devices of individuals in a building where there is a crisis, such as a hostage situation, a robbery in progress, or other conflict. An initiating party may use one or more control connections as a method of assessing the scope of a situation. For example, an initiating party may use multiple control connections to receive information from multiple telecommunications devices to determine the geographic range of an event, such as the extent of a flood, a power outage, a terrorist attack or other situations. Data may be gathered from one or more devices and may be processed at a separate device such as Network Element 145. Data gathered from the multiple devices may help an initiating party determine a response to the situation.

An initiating party may receive information obtained by cameras, microphones or other capabilities of the one or more devices.

Returning to FIG. 2, at block 230, verification of the enablement of inbound calling or connection control requests may occur. In one or more embodiments, a network element of a service provider or telecommunications carrier of the destination device, such as Network Element 140, may receive the connection control request and verify that such requests are enabled for the destination device. Verification may include querying Telecommunication Device 110b, querying a Control Connection Request Database 145 or querying another verification source. For example Network Element 140 may query Control Connection Request Database 145 to verify one or more control connection requests. If connection control requests are not enabled, the method may end at block 280. If connection control requests are enabled the method may continue at block 240.

At block 240, a control connection request, such as Control Connection Request 115, may be authorized. For example, Network Element 140 may authorize Control Connection Request 115 based on the results of a query to Control Connection Request Database 145. Authorization may include querying the destination device, querying a network accessible database or querying another verification source. Authorization may depend on one or more attributes of Telecommunication Device 110a such as the user associated with Telecommunication Device 110a, the network address of a requesting device, the geographical location associated with Telecommunication Device 110b, a phone number associated with Telecommunication Device 110b, the type of Telecommunication Device 110b (i.e., PDA, cell phone, computer, etc), or other factors. An authorization source may authorize or deny a control connection request based on which functionality of a telecommunication device access is requested to, the time of control connection request, the location of the telecommunication device, or other factors. If connection control requests are not authorized, the method may end at block 280. If connection control requests are enabled the method may continue at block 250.

At block 250, a network element, the destination device, the control connection requesting device may determine whether to send a call notification or other indicator that one or more control connections have been established. The determination may be based on a setting established by a user of the destination device, by a network provider, a telecommunications carrier, a guardian of a user of the destination device, a purchaser of the destination device or other entity. Call notification may be determined for each control connection, may be fixed on or off for the device, or may be based on other criteria. If call notification is enabled and desired the method may continue at block 260. If call notification is not enabled or desired the method may continue at block 270.

If notification is not desired, the telecommunication device receiving the control request may operate in a quiet or a secret mode. For example, Telecommunication Device 110b may be set for a secret mode whereby no indicator of a control connection may be given. In one or more embodiments, secret mode may be set on or off by a user of a device requesting a control connection. Secret mode may depend upon authorization or authentication of a control connection requestor, the location of Telecommunication Device 110b, the type of functionality requested by the control connection request, the type of functionality provided by Telecommunication Device 110b, the time of the control connection request, or other factors. In some embodiments, secret mode may be set on or off by a user of Telecommunication Device 110b, a network service provider, a telecommunications carrier, or other entity with proper authorization.

A secret command may enable a user of Telecommunication Device 110a to gather information from Telecommunication Device 110b without the knowledge of a user of Telecommunication Device 110b. For example, a user of Telecommunication Device 110b may activate the device using a secret command when the user of Telecommunication Device 110b is being robbed. This may enable the conflict to be taped and transmitted to authorities for investigation and prosecution of the criminal.

In another example, a user of Telecommunication Device 110a may activate Telecommunication Device 110a in a secret mode via a control connection to Telecommunication Device 110b, enabling transmission of data from Telecommunication Device 110b. This may enable a user of Telecommunication Device 110a to monitor a user of Telecommunication Device 110b and/or surroundings without detection by the user.

Returning to FIG. 2, at block 260, if an indicator is enabled and/or desired the destination device may flash one or more lights, may vibrate, may play an audio alert, display a text message or provide other indicators. Audio alerts may include a ring tone, a transmitted spoken message, a recorded message, music, or other audio indicator. For example, Control Connection Request 115 may cause Telecommunication Device 110b to give a visual, audible or other indicator that a control connection is being established. The method may continue at block 270.

At block 270, one or more control connection requests may be connected providing access to one or more functionalities of the telecommunications device. For example, a guardian may connect to Telecommunication Device 110b to monitor a child and may utilize the device's video capture, image capture or audio capture capabilities to do so. Additionally an emergency responder may concurrently have access to these capabilities or to a different level of capabilities. An emergency dispatcher may be given superior access and may receive video and audio from Telecommunication Device 110b while transmitting audio instructions to the child through Telecommunication Device 110b. Concurrently, a guardian may receive only transmissions from Telecommunication Device 110b, but may not be able to transmit to Telecommunication Device 110b. In another example, two emergency responders may be able to connect concurrently to Telecommunication Device 110b and may share the capabilities of Telecommunication Device 110b. One responder may monitor video and direct response teams and another responder may provide verbal instructions to one or more victims. Concurrent connections may be established using multiple control connections or by using one or more control connections and a standard voice, data or other connection. For example, a control connection may be established while a voice call or messaging connection is active.

At block 270, in one or more embodiments, once Control Connection Request 115 is authorized, it may open a channel to Telecommunication Device 110b without a response from a user of Telecommunication Device 110b. Control Connection Request 115 may power on Telecommunication Device 110b if it is powered off at the time of the request.

For example, at block 270 Control Connection Request 115 initiated by a user of Telecommunication Device 110a may be connected providing access to one or more functionalities of Telecommunication Device 110b. In one or more embodiments, if the user interface of Telecommunication Device 110a is capable of handling the functionality of Telecommunication Device 110*b*, once a control connection has been established to Telecommunication Device 110*b*, Telecommunication Device 110*a* may mimic the display of Telecommunication Device 110*b* in order for a user of Telecommunication Device 110*a* to access the functionality of Telecommunication Device 110*b*. In other embodiments, a function mapping may be programmed into Telecommunication Device 110*a* so that functionality of Telecommunication Device 110*b* is mapped to the user interface of Telecommunication Device 110*a*. This may be done by assigning functionality of Telecommunication Device 110*b* to buttons, menus or other input mechanisms of the user interface of Telecommunication Device 110*a*. In other embodiments, once a control connection has been established to Telecommunication Device 110*b*, Telecommunication Device 110*a* may present a menu, a prompt or other interface for accessing the functionality of Telecommunication Device 110*b*. Telecommunication Device 110*a* may transmit voice commands to Telecommunication Device 110*b* and Telecommunication Device 110*b* may employ speech recognition technology to respond to preprogrammed commands. Telecommunication Device 110*a* may enable other interfaces for controlling Telecommunication Device 110*b*.

At block 280, the method may end.

Figure 3:
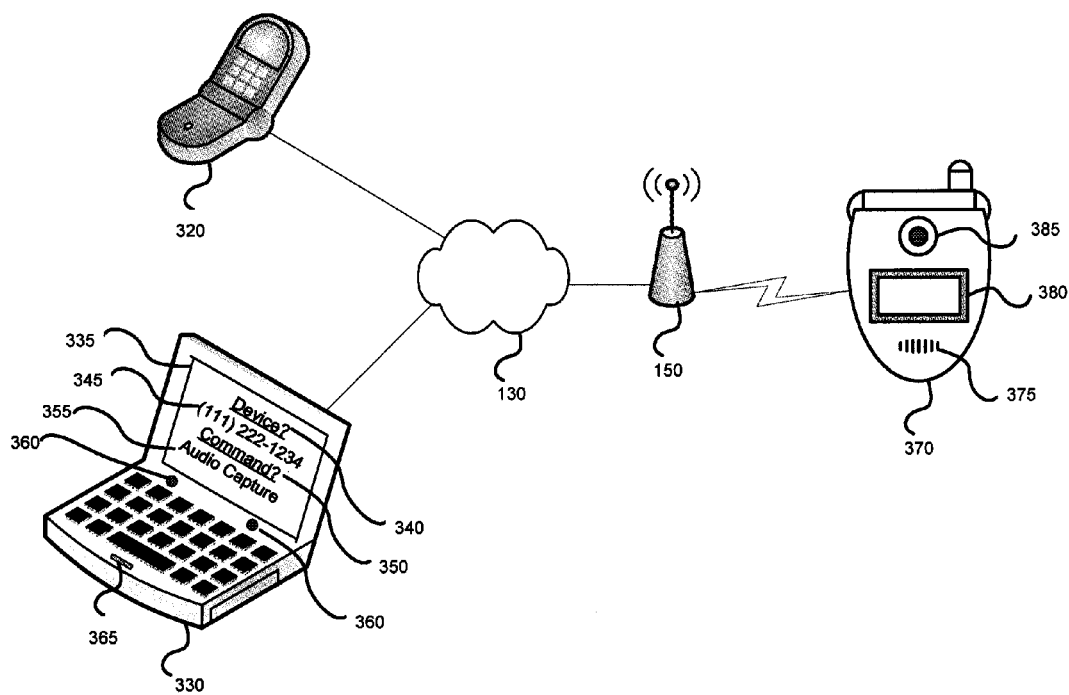
FIG. 3 is an inbound phone control system, in accordance with an exemplary embodiment of the disclosure.

Referring to FIG. 3, an inbound phone control system is illustrated, in accordance with an exemplary embodiment of the disclosure. System 300 illustrates an exemplary system for inbound phone control and handling connection control requests. As shown, Cell Phone 320 may be a standard cell phone. Telecommunications Device 330 may be a laptop. Telecommunications Devices 320 and 330 may establish connections with Network 130. Network 130 may permit the transmission of connection control requests to Telecommunications Device 370 via a network element such as Network Access Device 120*b*.

In this exemplary embodiment, Cell Phone 320 may use voice commands or accept keypad commands, touch screen commands or other input to establish a control connection to Telecommunications Device 370. Cell Phone 320 may provide another interface to establish a control connection to Telecommunications Device 370 as well as to facilitate access to one or more controlled functionalities of Telecommunications Device 370. Cell Phone 320 may provide an interface to display data received from Telecommunications Device 370. Cell Phone 320 may contain one or more speakers to play audio data received from Telecommunications Device 370. If the requesting and destination telecommunication devices are similar, once a control connection is established Cell Phone 320 may mimic the functionality of Telecommunications Device 370. For example, pressing a camera button on Cell Phone 320 may cause an image to be taken on Telecommunications Device 370. In other embodiments, a function mapping may be programmed so that functionality on a requesting device performs the corresponding functionality on the destination device. An escape functionality may be provided to return the requesting device to normal functionality. A toggle functionality may also be provided to alternate between controlling a requesting device and a target device.

Telecommunications Device 330 may be a second network or telephony enabled device and may establish a control connection to Telecommunications Device 370. Telecommunications Device 330 may be a laptop which provides a command interface using Display 335 to establish a control connection to Telecommunications Device 370. Telecommunications Device 330 may provide a Command Line Prompt 340 requesting data to identify the desired destination device. A user of Telecommunications Device 330 may specify Device Identifying Data 345 using a phone number, a network address, a user name or other identifying criteria of Telecommunications Device 370. Display 335 may further prompt a user with one or more Command Requests 350 enabling a user to specify desired functionality to be performed on Telecommunications Device 370. A user may enter one or more Commands 355 to request functionality from Telecommunications Device 370. In one or more embodiments, other interfaces may be established, including a graphical user interface displaying an image of a target device and allowing a user to use a pointing device, a keyboard or other devices to select functionality of a device and activate it. The interface may provide menus, buttons, fields or other features to facilitate control of the remote device. The interface may provide a window or a portion of a window displaying a status of the remote device. The interface may contain a window or a portion of a window displaying data received from the remote device. The interface may be capable of displaying images such as bitmaps, JPEGs, GIF or other image file types. The interface may be capable of playing video such as MPEGs, Windows Media Videos (WMV), Quicktime videos or other video formats. Telecommunications Device 330 may store data received from Telecommunications Device 370 on local storage. Telecommunications Device 330 may contain one or more Speakers 360 for playing audio received from Telecommunications Device 370. Telecommunications Device 330 may contain one or more Microphones 365 for capturing voice commands to be performed on Telecommunications Device 370 or for capturing audio to be played on Speaker 375 of Telecommunications Device 370. In one or more embodiments, Telecommunications Device 330 may be programmed to automatically obtain a control connection to Telecommunications Device 370. Telecommunications Device 330 may be programmed to obtain data from Telecommunications Device 370 and store the data or to send a notification to a user if specified criteria are met. For example, Telecommunications Device 330 may obtain Global Positioning System (GPS) data from Telecommunications Device 370 and may alert a user if Telecommunications Device 370 is not at a specified location at a specified time.

The interface of Telecommunications Device 330 may permit the controlling of multiple devices through multiple concurrent control connections. Telecommunications Device 330 may permit a user to toggle through various windows or menu selections to alternate between devices to which Telecommunications Device 330 has a control connection established. Telecommunications Device 330 may also permit a single interface for controlling all devices. For example, Telecommunications Device 330 may provide a single interface for inputting a message to be broadcast to multiple devices. Furthermore, Telecommunications Device 330 may provide a single interface with multiple tiled windows for displaying video or images received from multiple devices.

Telecommunications Device 330 may connect to Network 130 via a wireless connection and may use standard protocols including IEEE 802.11a, 802.11b and 802.11g. Telecommunications Device 370 may connect to Network 130 via a wired connection using a network connection such as an IEEE Ethernet 802.3, a fiber connection or other connection. Network 130 may be a local area network (LAN), a wide area network (WAN), the Internet, or other network capable of transmitting a control connection.

Network Access Device 120*b* may be a wireless access point (WAP) permitting Network 130 to transmit a control connection request to Telecommunication Device 370. In other embodiments, Network Access Device 120b may be a Session Initiation Protocol Device, a modem, a router, a switch or other network access device.

Telecommunication Device 370 may be a cellular phone, a mobile phone, a cordless phone, an analog phone, a Personal Digital Assistant (PDA), a computer, a Session Initiation Protocol (SIP) enabled telecommunication device, pagers, video conferencing stations or another telephony enabled device capable of receiving a control connection request from a remote telecommunications enabled device. Telecommunication Device 370 may contain a Speaker 375 through which warnings, instructions or other communications or audio may be transmitted in response to a control connection request. For example, previously recorded voice warnings, visual images, video, or other indicators may transmit warnings. The warnings may be customized for a user of Telecommunication Device 370. The warnings or information may be transmitted in response to a particular situation being detected by one or more capabilities of Telecommunication Device 370. For example, a student off of school grounds during school hours may be detected by the Global Positioning System (GPS) of Telecommunication Device 370 and a parent's warning may be transmitted to them. In another example, a weather alert voice recording may be transmitted to individuals in the vicinity of a severe storm. Telecommunication Device 370 may contain a Camera 385 which may enable the capture of video and images in response to a control connection request.

In one or more embodiments directed towards theft prevention, security applications, military applications or other purposes, Telecommunications Device 370 may contain the capability to spray or emit dye or other marking substances in order to permit the subsequent identification of criminals. Telecommunications Device 370 may enable the transmission of an electric shock to an individual touching the phone. Telecommunications Device 370 may be detonated in response to a control connection request. Telecommunications Device 370 may contain other capabilities to harm or disable a security threat or to protect Telecommunications Device 370 or data contained on Telecommunications Device 370. For example, Telecommunications Device 370 may self-destruct, erase all stored data, scramble data, encode data, and/or substitute decoy or dummy data. This may be done in response to a command from a control connection, a command inputted by a user of Telecommunications Device 370, in response to a security threat to Telecommunications Device 370 or for other security purposes.

In one or more embodiments, Telecommunications Device 370 may contain additional devices or be operatively connected to additional devices. A control connection may access one or more of these devices remotely through functionalities of Telecommunications Device 370. For example, Telecommunications Device 370 may contain antennas that are electronically controlled and may extend or retract. Additionally, Telecommunications Device 370 may contain features that permit mobility of the device or increase monitoring capability, improve transmission or reception capability or other purposes. Telecommunications Device 370 may contain features that permit panning of a camera. For example, Telecommunications Device 370 may contain a motorized rotating base, motor driven wheels, a telescoping base, telescoping appendages or attachments, rotating appendages or attachments and other features. Telecommunications Device 370 may contain one or more wheels on one surface of the device, enabling the device to rest on the one or more wheels. The one or more wheels may be operatively linked to one or more electric motors. The one or more motors may receive one or more commands from a processor element of the telecommunications device in response to a control request. In response to the control request, the telecommunications device may utilize the motor and the wheels to move to obtain a different view of the current area through a camera of the device or a view of a different area. One or more wheels of the telecommunications device may have an adjustable drive angle, which may adjust in response to a control request. This may enable the direction of the telecommunications device to be controlled. In another example, Telecommunications Device 370 may contain a base that is rotatably connected to the body of the telecommunications device. Telecommunications Device 370 may contain one or more motors which may enable the device to rotate along the axis of the base in response to one or more control requests. The rotation may enable the device to obtain different audio or imagery data.

In some embodiments, Telecommunication Device 370 may respond to triggering events. Telecommunication Device 370 may remain in a standby mode until activated by one or more actions in the surrounding area. For example, Telecommunication Device 370 may respond to a spoken command using voice recognition and may begin recording or live transmission of video, audio or other data. Telecommunication Device 370 may respond to an audio signal such as a scream, a gunshot, an explosion or other signal and may begin recording or live transmission of video, audio and/or other data. Telecommunication Device 370 may send a preprogrammed text message, email, voice message or other signal to a receiving party indicating that a particular audio signal such as a command or a gunshot has been received. Telecommunication Device 370 may further transmit other data such as Global Positioning System (GPS) location information.

Telecommunication Device 370 may monitor a surrounding area and may be programmed to detect conditions outside a specified range. For example, Telecommunication Device 370 may detect if a noise level detected by a microphone of the device is above or below a specified range. Telecommunication Device 370 may be operably connected to other devices or may contain other devices and/or functions and may transmit sensor data based on information obtained from them. For example, Telecommunication Device 370 may transmit data or perform other operations if a thermometer providing information to Telecommunication Device 370 alerts the device that the temperature is outside of a specified range. Telecommunication Device 370 may similarly measure, humidity, pressure or other environmental readings.

In one or more embodiments, Telecommunication Device 370 may be activated by a secret command. A secret command may be a touch of one or more buttons from a user of the device. For example, the touch of a single external button on Telecommunication Device 370 may begin recording or live transmission of video, audio or other data without giving an indicator that Telecommunication Device 370 is activated. Telecommunication Device 370 may contain a motion detector such as a passive infrared motion detector, a microwave motion detector, or other motion detector which may activate Telecommunication Device 370. Telecommunication Device 370 may contain a light sensor which may activate the device. Telecommunication Device 370 may be programmed to activate upon the detection of sudden erratic movements of a user. Telecommunication Device 370 may activate in response to a reading from an inclinometer or tilt sensor. Telecommunication Device 370 may, in response to activation, transmit real time data, record data, play an audio warning through a speaker, display a text, video, or image based warning or other action. For example, Telecommunication Device 370 may warn an intruder that police have been contacted, may reassure an injured person that emergency personnel have been contacted or take other actions.

Telecommunication Device 370 may be programmed by a control connection from Telecommunications Device 330 to activate based upon Global Positioning System (GPS) location information. For example, Telecommunication Device 370 may transmit a message to a preprogrammed location, such as a parent's email address, if Telecommunication Device 370 receives Global Positioning System (GPS) coordinates indicating the carrier of the device has left school grounds during a child's school day. Telecommunication Device 370 may complete this action without giving a visible indicator on the device or providing a record of the transmission on the device.

Figure 4:
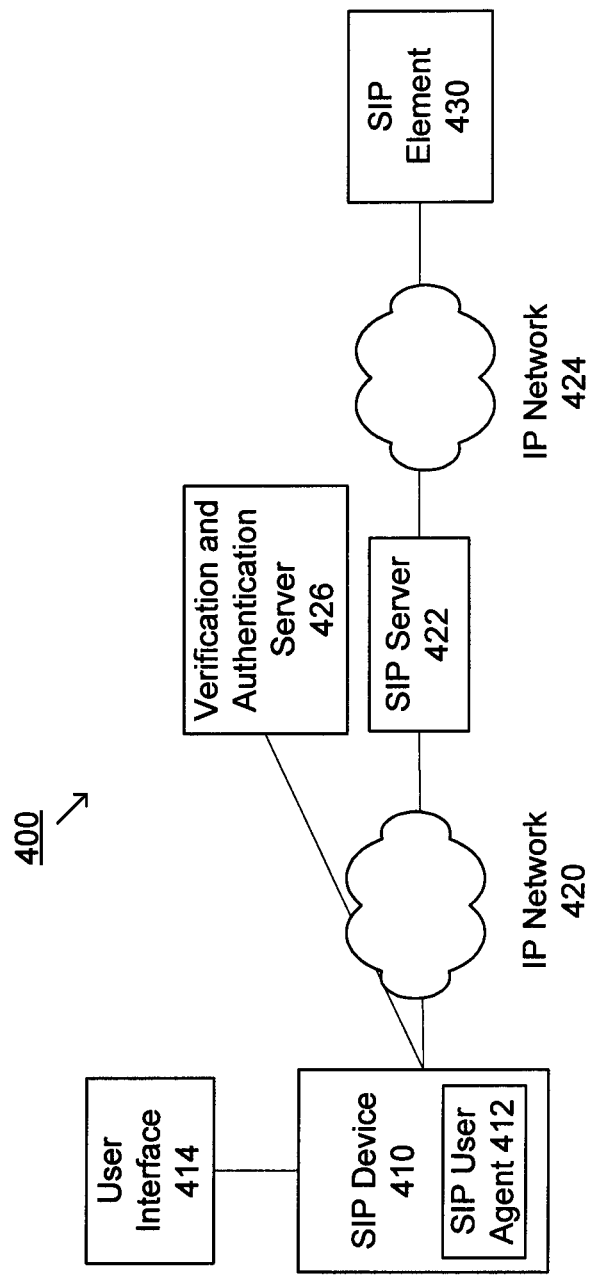
FIG. 4 is an inbound phone control system utilizing a SIP based network, in accordance with an exemplary embodiment of the disclosure.

Referring to FIG. 4, an inbound phone control system utilizing a SIP based network is illustrated, in accordance with an exemplary embodiment of the disclosure. System 400 illustrates an exemplary system for supporting SIP communication, in particular, inbound call control of a telecommunications device using a control connection. As illustrated, SIP Device 410 may be coupled to User Interface 414. SIP Device 410 may include a SIP User Agent 412 for communicating across IP Network 420 to a SIP Server 422. SIP Server 422 may provide communication to other SIP devices, as shown by SIP Element 430 and SIP element 432, through IP Network 424. Verification and Authentication Server 426 may provide verification and authentication functionality to SIP elements through IP network 420. The various components of system 400 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 410 may represent a device that manages User Interface 414. User Interface 414 may include a traditional telephone, a voice over IP (VOIP) enabled phone and other data communication device using voiceband or other signaling. SIP Device 410 may contain SIP User Agent 412. SIP User Agent 412 may be integrated with SIP Device 410 or remote from SIP Device 410. SIP User Agent 412 may perform interworking between SIP signaling and user interface actions. For example, SIP User Agent 412 may manage an exchange of media (e.g., audio, etc.) between User Interface 414 and a Real Time Protocol (RTP) media stream of a media session set up by the SIP signaling. SIP Device 410 may originate calls to and receive calls from other users. SIP Device 410 may communicate through IP Network 420 to SIP Server 422.

SIP Server 422 may represent a SIP proxy or application server that acts on behalf of SIP Device 410. For example, SIP Server 422 may manage a SIP Address of Record (AOR) on behalf of SIP Device 410. SIP Device 410 may register with SIP Server 422 and send SIP signaling through SIP Server 422 to other SIP elements, such as SIP Element 430 and SIP Element 432. For example, a call to the SIP AOR may be delivered to SIP Server 422, which in turn delivers the call to SIP Device 410. SIP Server 422 may perform some service on behalf of SIP Device 410, or may simply forward SIP messages to and from SIP Device 410. SIP Device 410 communicates through IP Network 424 to SIP Element 430 and/or SIP Element 432.

Verification and Authentication Server 426 may represent a server that may respond to a request from SIP Server 422 or from SIP Device 410. In response to the request Verification and Authentication Server 426 may authenticate a user of SIP Device 410. According to another embodiment of the disclosure, SIP Device 410 may not require authentication or may connect directly to SIP Element 430 and may be authenticated by SIP Element 430. SIP Device 410 may then receive commands from or send data to User Interface 414.

SIP Element 430 may represent a user with which the user of SIP Device 410 communicates. SIP Element 430 may be a SIP Device, SIP Server, and/or other SIP enabled device.

In one or more embodiments, SIP User Agent 412 may enable a user of User Interface 414 to establish a control connection to SIP Element 430. SIP User Agent may request the connection from SIP Server 422. SIP Server 422 may verify that inbound call control using control connection requests is enabled for SIP Element 430 by querying Verification and Authentication Server 426. SIP Server 422 may query Verification and Authentication Server 426 using a phone number, a network address, a machine name, a username or other identifying criteria. Alternatively, inbound calling may be enabled or disabled by a subnet, geographical region, country code or other group identification criteria. SIP Server 422 may additionally query Verification and Authentication Server 426 to authorize a inbound call control connection request by authenticating a requesting SIP Device 410 or a user of User Interface 414. Authorization may depend on a attributes of a requesting device such as the user associated with a requesting device, the network address of a requesting device, the geographical location associated with a requesting device, a phone number associated with a requesting device, the type of requesting device (i.e., PDA, cell phone, computer, etc), or other identifying factors. An inbound call control connection request may also be requested by a system which may be programmed for monitoring utilizing control connection requests to remote telecommunication devices. Verification and Authentication Server 426 may authorize control connection requests by verification of a password, an encrypted key, a code or other validation indicator. Verification and Authentication Server 426 may authorize or deny an inbound call control request based on the nature of the control connection request. Verification and Authentication Server 426 may authorize or deny a control connection request based on which functionality of SIP Element 430 access is requested to, the time of control connection request, the location of SIP Element 430, or other pre-specified limiting factors.

Once an inbound call control request is authorized SIP Server 422 may connect SIP Device 410 to SIP Element 430 via IP Network 424. A user of User Interface 414 may have access to one or more functionalities of SIP Element 430.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system, comprising:
a network element communicatively coupled to a network and configured to:
receive, over the network from a requesting telecommunications device, a request configured to provide remote monitoring of a target telecommunications enabled device by the requesting telecommunications device, authorize the requesting telecommunications enabled device as capable of performing the remote monitoring of the target telecommunications enabled device, determine a level of authorization of the requesting telecommunications enabled device;

program a mapping of functionalities between the requesting telecommunications enabled device and the target telecommunications enabled device according to the level of authorization of the requesting telecommunications device, and establish a control connection to the target telecommunications enabled device to provide the remote monitoring according to the mapping of functionalities;

wherein the network element is further configured to enable said requesting telecommunications enabled device to provide concurrent remote monitoring of the target telecommunications enabled device and a second target telecommunications enabled device via a second control connection; and wherein the network element is further configured to enable said requesting telecommunications enabled device to display visual data received from the target telecommunications enabled device and the second target telecommunications enabled device.

2. The system of claim 1, wherein the remote monitoring of the target telecommunications enabled device is performed to monitor, without detection by a user of the target telecommunications enabled device, at least one of the user of the target telecommunications enabled device and surroundings of the user of the target telecommunications enabled device.

3. The system of claim 1, wherein the network element is further configured to mimic a user interface of the target telecommunications enabled device on a user interface of the requesting telecommunications device.

4. The system of claim 1, wherein the mapping of functionalities includes at least one of: (i) an escape functionality configured to return the requesting telecommunications device to normal functionality; and (ii) a toggle functionality configured to alternate between monitoring the target telecommunications device and controlling the requesting telecommunications device.

5. The system of claim 1, wherein the mapping of functionalities includes a toggle functionality configured to alternate between monitoring the target telecommunications device and monitoring the second target telecommunications enabled device.

6. The system of 1, wherein the network element is further configured to broadcast a message to the target telecommunications enabled device and the second target telecommunications enabled device.

7. A method, comprising:

receiving, over the network from a requesting telecommunications device, a request configured to provide remote monitoring of a target telecommunications enabled device by the requesting telecommunications device;

authorizing the requesting telecommunications enabled device as capable of performing the remote monitoring of the target telecommunications enabled device;

determining a level of authorization of the requesting telecommunications enabled device;

programming, by the network element, a mapping of functionalities between the requesting telecommunications enabled device and the target telecommunications enabled device according to the level of authorization of the requesting telecommunications device;

establishing a control connection to the target telecommunications enabled device to provide the remote monitoring according to the mapping;

enabling said requesting telecommunications device to establish a second control connection to a second target telecommunications enabled device to provide concurrent remote monitoring of the target telecommunications enabled device and the second target telecommunications enabled device; and including, in the mapping of functionalities, a user interface for displaying visual data received from the target telecommunications enabled device and the second target telecommunications enabled device.

8. The method of claim 7, further comprising mimicking a user interface of the target telecommunications enabled device on a user interface of the requesting telecommunications device.

9. The method of claim 7, further comprising including, in the mapping of functionalities, at least one of: (i) an escape functionality for returning the requesting telecommunications device to normal functionality; and (ii) a toggle functionality for alternating between monitoring the target telecommunications device and controlling the requesting telecommunications device.

10. The method of claim 7, further comprising including, in the mapping of functionalities, a toggle functionality for alternating between monitoring the target telecommunications device and monitoring the second target telecommunications enabled device.

11. The method of claim 7, further comprising including, in the mapping of functionalities, a user interface for broadcasting a message to the target telecommunications enabled device and the second target telecommunications enabled device.

12. A non-transitory computer readable medium storing a software program, the software program being executable to provide operations comprising:

receiving, by a network element from a requesting telecommunications device, a request configured to provide remote monitoring by the requesting telecommunications device to functionality of a target telecommunications enabled device;

determining a level of authorization of the requesting telecommunications enabled device;

programming, by the network element, a mapping of functionalities between the requesting telecommunications enabled device and the target telecommunications enabled device according to the level of authorization of the requesting telecommunications device; and establishing a control connection to the target telecommunications enabled device to provide the remote monitoring according to the mapping;

wherein the operations further comprise enabling said requesting telecommunications device to establish a second control connection to a second target telecommunications enabled device to provide concurrent remote monitoring of the target telecommunications enabled device and the second target telecommunications enabled device; and wherein the operations further comprise including, in the mapping of functionalities, a user interface for displaying visual data received from the target telecommunications enabled device and the second target telecommunications enabled device.

13. The computer readable medium of claim 12, wherein the operations further comprise:

determining a level of authorization of the requesting telecommunications enabled device; and determining the mapping of functionalities according to the level of authorization of the requesting telecommunications device.

14. The computer readable medium of claim 12, wherein the operations further comprise mimicking a user interface of the target telecommunications enabled device on a user interface of the requesting telecommunications device.

15. The computer readable medium of claim 12, wherein the operations further comprise including, in the mapping of functionalities, at least one of: (i) an escape functionality for returning the requesting telecommunications device to normal functionality; and (ii) a toggle functionality for alternating between monitoring the target telecommunications device and controlling the requesting telecommunications device.

16. The computer readable medium of claim 12, wherein the operations further comprise including, in the mapping of functionalities, a toggle functionality for alternating between monitoring the target telecommunications device and monitoring the second target telecommunications enabled device.

17. The computer readable medium of claim 12, wherein the operations further comprise including, in the mapping of functionalities, a user interface for broadcasting a message to the target telecommunications enabled device and the second target telecommunications enabled device.

18. The system of claim 1, wherein the mapping of functionalities is such that at least one specific input mechanism on the requesting telecommunications device is mapped to an input mechanism on the target telecommunications device that provides functionality corresponding to functionality associated with the input mechanism on the requesting telecommunications device.

19. The method of claim 7, wherein the mapping of functionalities is such that at least one specific input mechanism on the requesting telecommunications device is mapped to an input mechanism on the target telecommunications device that provides functionality corresponding to functionality associated with the input mechanism on the requesting telecommunications device.

20. The medium of claim 12, wherein the mapping of functionalities is such that at least one specific input mechanism on the requesting telecommunications device is mapped to an input mechanism on the target telecommunications device that provides functionality corresponding to functionality associated with the input mechanism on the requesting telecommunications device.

* * * * *